United States Patent [19]

Lupo et al.

[11] Patent Number: 4,850,475

[45] Date of Patent: Jul. 25, 1989

[54] CONVEYOR SYSTEM INCLUDING A CHAIN DRIVE FOR DRIVING AN ENDLESS BELT IN TENSIONED CONDITION

[76] Inventors: Joseph Lupo, 47 Myrtle Ave., Nutley, N.J. 07110; Frank Chipchase, 21 St. George St., West Milford, N.J. 07480

[21] Appl. No.: 169,003

[22] Filed: Mar. 16, 1988

Related U.S. Application Data

[63] Continuation of Ser. No. 73,185, Jul. 14, 1987, abandoned, which is a continuation of Ser. No. 792,900, Oct. 30, 1985, abandoned.

[51] Int. Cl.⁴ ............................................. B65G 21/18
[52] U.S. Cl. ..................................... 198/778; 198/814; 198/841; 198/833
[58] Field of Search ............... 198/778, 781, 814, 833, 198/841

[56] References Cited

U.S. PATENT DOCUMENTS

| | | | |
|---|---|---|---|
| 2,446,890 | 8/1948 | Stadleman | 198/833 X |
| 2,753,039 | 7/1956 | Vecten et al. | 198/814 |
| 3,269,142 | 8/1966 | Moca et al. | 198/778 X |
| 3,270,863 | 9/1966 | Ackles | 198/833 |
| 3,348,659 | 10/1967 | Roinestad | 198/778 |
| 3,682,295 | 8/1972 | Roinestad | 198/833 |
| 3,835,982 | 9/1974 | Zappia | 198/841 X |
| 4,488,639 | 12/1984 | Vogt et al. | 198/781 |
| 4,565,282 | 1/1986 | Olsson et al. | 198/778 |
| 4,653,631 | 3/1987 | Heybourn et al. | 198/778 |
| 4,741,430 | 5/1988 | Roinestad | 198/778 |

FOREIGN PATENT DOCUMENTS 0765760 1/1957 United Kingdom ............... 198/778

Primary Examiner—Frank E. Werner
Assistant Examiner—D. Glenn Dayoan
Attorney, Agent, or Firm—Louis E. Marn

[57] ABSTRACT

The conveyor system has an endless chain slidingly mounted on and coiled about a frame. This chain has a spaced plurality of linked pins. A drive motor is coupled to the chain for circulating it around the frame. The system has an endless belt coiled around the frame for bearing edgewise over a predetermined length of the chain centrally on its pins. Thus, circulation of the chain causes circulation of the belt.

3 Claims, 8 Drawing Sheets

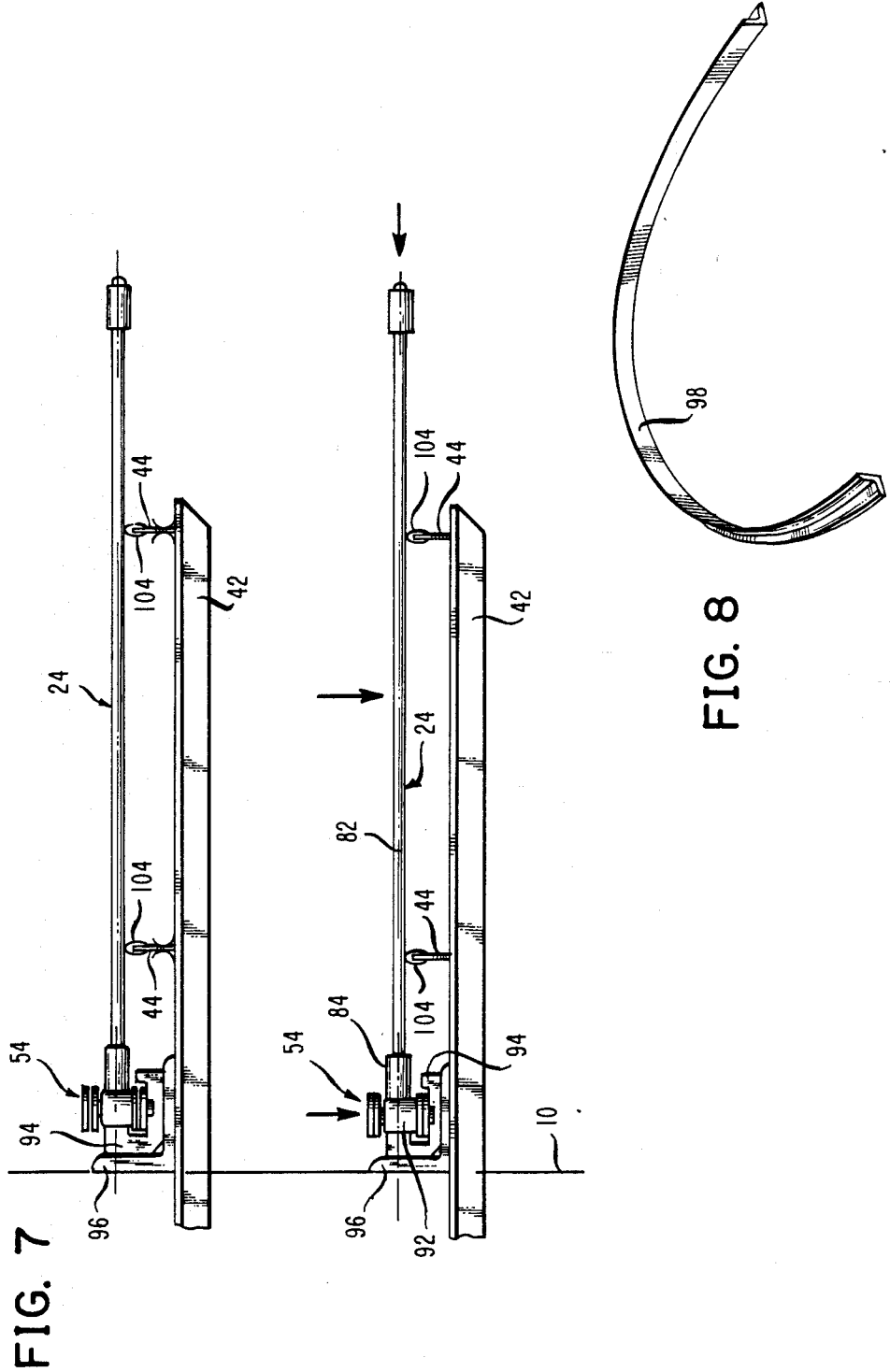

CONVEYOR SYSTEM INCLUDING A CHAIN DRIVE FOR DRIVING AN ENDLESS BELT IN TENSIONED CONDITION

This is a continuation application of United States Application Serial No. 07/073,185, filed July 14, 1987 (now abandoned) which is a continuation application of United States Application Serial No. 06/792,900, filed Oct. 30, 1985 (now abandoned).

BACKGROUND OF THE INVENTION

The present invention relates to endless conveyor belts and, in particular, to belt systems driven directly by an endless chain in a spiral pattern.

It is known to construct a metal conveyor belt from a plurality of loosely linked rods (U.S. Pat. No. 4,078,655). Such a belt can turn in different directions and is used for moving various products such as baked goods or other manufactured goods which require a transit time to allow cooling, drying, etc.

It has been proposed to turn such a belt 180° while maintaining the rods horizontal. Such turning is accomplished by routing an endless chain around a semicircular arc. Under these circumstances the belt can directly engage the endless chain and be driven thereby (U.S. Pat. No. 3,270,863).

It has been found difficult to route conveyor belts in a spiral pattern. For example, if belts of the foregoing type (loosely coupled rods) are driven by a chain, intermediating devices have been needed to create an appropriate grip between the chain and the belt. In some instances, a plurality of cleats were welded to the chain to ensure a grasp between chain and belt (U.S. Pat. No. 3,682,295). Such structure adds additional weight, however, and results in a more elaborate product involving large amounts of labor to weld many cleats to a chain.

It is known to drive a conveyor belt in a spiral path by providing a central cage that turns as a whole, similar to a capstan. The conveyor belt is wound around this cage to turn with it. Because of the nature of this design, slippage between the belt and cage is expected. This unfortunately increases wear, vibration and noise. Because of the unpredictable nature of the slip a variable speed drive motor is necessary to produce a predictable conveyor speed. Another disadvantage with this type of structure is that the rotating weight of the turning structure is high. Furthermore, central reinforcements are necessary in the cage and as a result, there is no open space in the center of the cage. This precludes the possibility of mounting accessory components in the center of the cage (or building the conveyor around an obstruction such as a building column).

It is also known to replace the turning central cage with a plurality of spaced spindles arranged in a circle and rotating synchronously. Each of these vertical spindles has a friction wheel for directly engaging the conveyor belt. A disadvantage of this type of system is the necessity of having many rotating shafts with the spaces between the shafts nevertheless non-driving. Consequently, the operation of the latter system tends to be uneven and rough. The inner perimeter of the spindle-type of system is not a smooth circle but a multisided polygon. This means the belt actually travels in a straight line between drive rings, periodically turning around a spindle which has a radius far less than the recommended radius that the belt is designed for. This instantaneous belt radius creates unusually high operating tension in the belt and effectively reduces its life. Also, this uneven motion produces belt flexing at each drive spindle that disorients the product being conveyed. Another disadvantage with the spindle type of systems is that they often require an outside guide to hold the conveyor belt against the inner driving apparatus. This apparatus increases the assembly size as well as increasing friction and wear.

Accordingly, there is a need for an improved conveyor system wherein a belt may be circulated spirally and driven by a spiralled chain, wherein the belt is arranged to close on the spiral in a simple and efficient manner.

SUMMARY OF THE INVENTION

In accordance with the illustrative embodiments demostrating features and advantages of the present invention, there is provided a conveyor system having a frame and an endless chain slidingly mounted on and coiled about this frame. This chain has a spaced plurality of linked pins. The system also has a drive means coupled to the chain for circulating it around the frame. Also included is an endless belt coiled around the frame for bearing edgewise over a predetermined length of the chain, centrally on its pins. Thus, circulation of the chain causes circulation of the belt.

Also, in accordance with the same invention there is provided a method for spirally conveying with an endless belt and an endless chain, the latter having a spaced plurality of linked pins. The method includes the step of circulating the chain in a spiral pattern. Another step is wrapping the belt edgewise about the chain in the spiral pattern to bear centrally on the pins. The spiral is closed by: folding the belt to reverse direction, travel vertically and return to the spiral pattern.

By employing apparatus and methods of the foregoing type, a highly improved conveyor system is achieved. In a preferred apparatus, an endless chain spirals about an open frame. The conveyor belt can be a series of loosely linked rods that bear edgewise directly against the center of the endless chain which is preferably roller chain. The belt may be pulled from the spiral with sufficient tension to hold the belt against the chain. This feature eliminates slippage at the belt/chain juncture. Because there is a positive link engagement between the drive chain and the edge of the conveyor belt. There is little wear on the belt and no need for a variable speed drive.

Because of this construction it is possible to orient the angular relationship between the input and output runs to suit each application. Also, in a preferred embodiment rails supporting the belt are formed into a polygonal plan so that wear is distributed evenly under the belt, thereby increasing belt life.

Preferably, the belt leaves the spiral from the bottom, folding underneath itself to move peripherally about the frame (various return angles may be used to establish different input and output positions). The returning belt may then be routed through a dancer structure. Preferably, this structure has an adjustable torque motor for pulling the returning belt and routing it around a dancer roller before finally returning to spiral on the frame. Preferably, the main drive motor increases tension gradually to allow a gradual acceleration and prevent: damage to drive components, unusually high conveyor belt tensions and product jarring. The adjustable torque motor can exhibit this gradual tension build-up as well.

When constructed in the foregoing manner, the belt can be chain-driven without relatively moving or flexing the rods of the belt. This allows smooth, vibration-free product flow through the complete cycle of the apparatus. Accordingly, product orientation is not disturbed from beginning to end. Furthermore, because of the manner of chain engagement, there is no need for an outer skeleton to press against the outside edge of the belt. Consequently, required floor space is minimized, as well as wear.

Another advantage of the preferred system is the ability to build a configuration having any desired number of tiers, feed rate, speed, and input and output angular offset; to meet the specific needs of each application.

BRIEF DESCRIPTION OF THE DRAWING

The above brief description as well as other features and advantages of the present invention will be more fully appreciated by reference to the following detailed description of presently preferred but nonetheless illustrative embodiments in accordance with the present invention when taken in conjunction with the accompanying drawings, wherein:

FIG. 7 is an elevational view of a pair of tiers for the system of FIG. 1;

FIG. 8 is a perspective view of the angle iron supporting the guide of FIG. 6;

FIG. 12 is a schematic diagram showing the wiring of the electrical components of the system of FIG. 1.

BRIEF DESCRIPTION OF THE PREFERRED EMBODIMENTS

Figure 1:
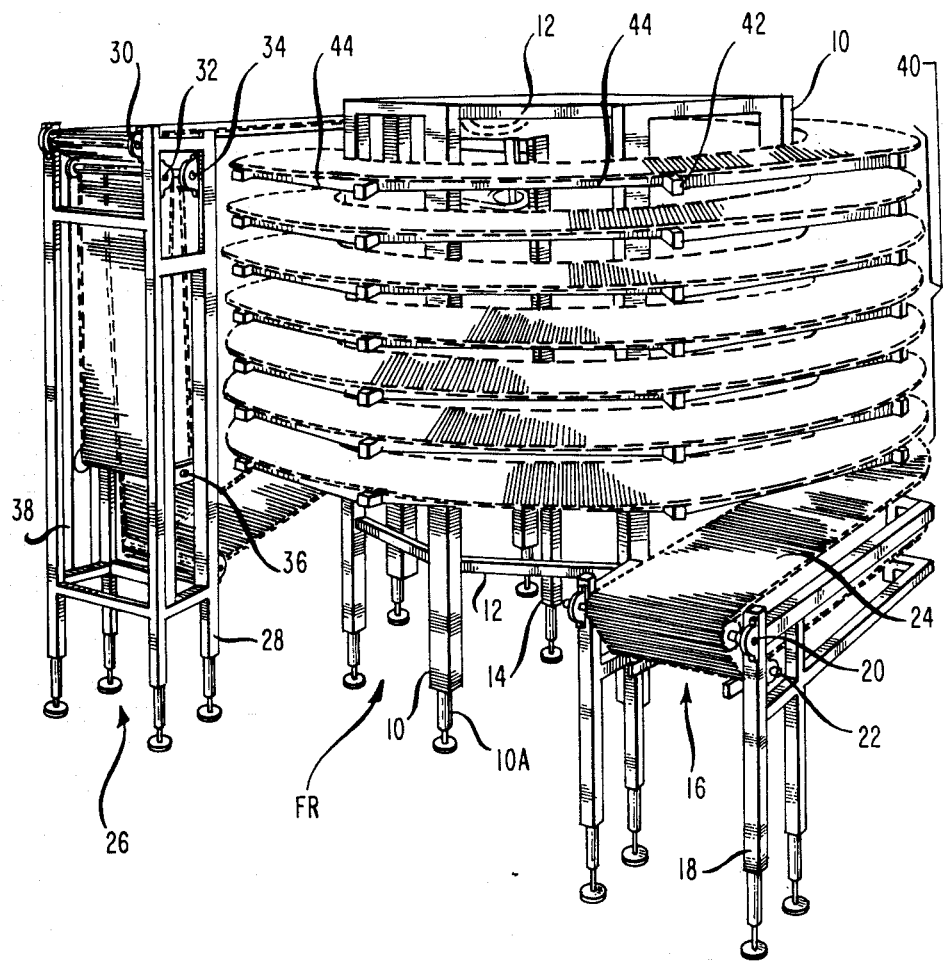
FIG. 1 is perspective view of a conveyor system according to the principles of the present invention.

Referring to FIG. 1, it shows a conveyor system composed primarily of tubular steel and plate steel which is preferably chemically etched and coated with a USDA approved and FDA accepted, zinc-based galvonizing compound. Construction with other metals including stainless steel or aluminum is possible. In this embodiment frame FR has eight uprights 10 having adjustably feet 10A and arranged in an equiangular, circular pattern with reinforcing brackets 12 connected between uprights 10 near their tops and bottoms. Additionally, a central upright 14, used as described hereinafter for supporting various drive components, is located within the perimeter formed by uprights 10. It will be appreciated that a different number of uprights can be used depending upon the size of the assembly and the desired turning radius of the conveyor system.

An output area 16 includes four supporting legs 18 forming a frame structure that supports shafts 20 and 22, shafts supporting gears for turning and folding conveyor belt 24. Conveyor belt 24 as shown further hereinafter, is composed of a plurality of loosely coupled rods to allow turning and folding in various directions. Input area 26 employs a frame having four legs 28 supporting at their tops, three shafts 30, 32 and 34. Shafts 30–34 have on each of their ends, gears for turning and folding conveyor belt 24. Conveyor belt 24 is formed between shafts 32 and 34 into a bight which cradles dancer roller 36. Dancer roller 36 is a shaft having at each end a pair of gears journaled in a slider slidably mounted within dancer guide 38, a guidee made of four parallel channels formed of sheet metal attached to legs 28.

As shown herein, conveyor belt 24 follows a coiled portion 40 which spirals around frame FR. A plurality of spokes 42 project from uprights 10. Spokes 42 are spanned by a plurality of struts 44, described hereinafter in greater detail.

Figure 2:
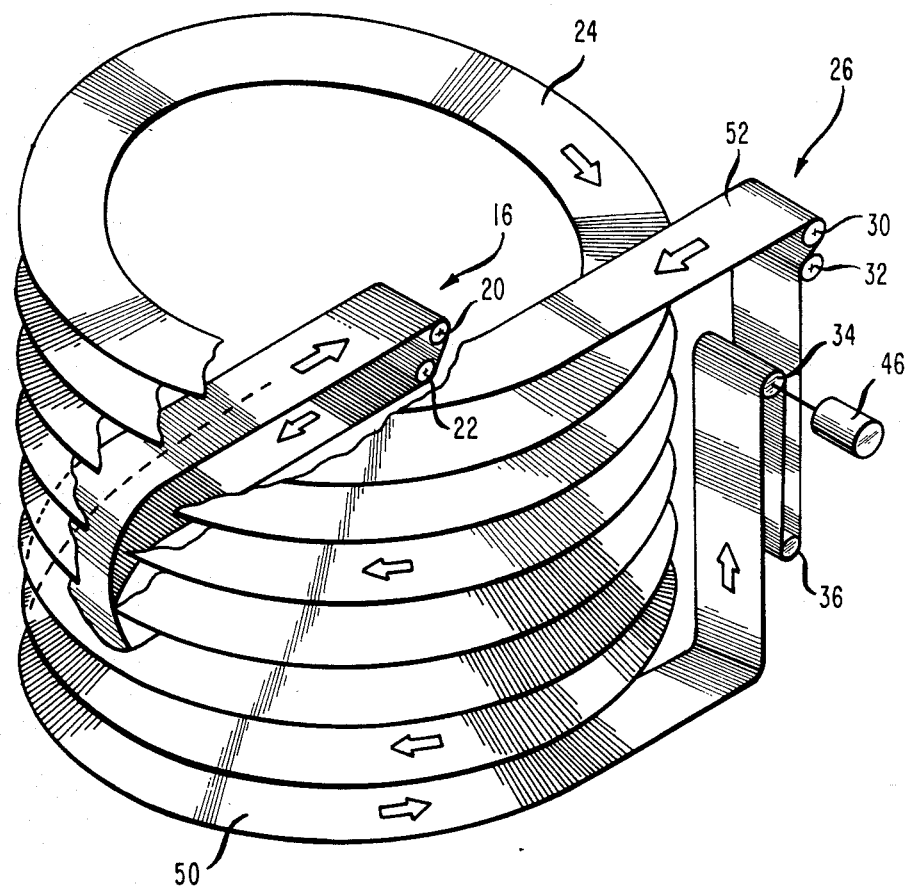
FIG. 2 is schematic diagram showing the routing of the belt of the system of FIG. 1.

Referring to FIG. 2 a schematic routing diagram is given for conveyor belt 24. As shown herein, radially spaced gears 32, 34 support belt 24 in a bight around dancer roller 36. Gear 34 is shown powered by a supplementary driver 46. As disclosed hereinafter in further detail, driver 46 may be a torque controlled motor used to provide the appropriate tension on conveyor belt 24 As shown in this view, conveyor belt 24 makes $6\frac{1}{2}$ turns, descending in a spiral or helical pattern. Belt 24 is shown spiralling downwardly although an upward spiral is contemplated for some embodiments. The final half turn terminates in a tangential projection of belt 24 to output location 16 at which location the conveyor belt 24 is folded underneath itself to return in the reverse direction 180° along turn 50. It is clearly indicated in this figure that turn 50 results in another tangential projection wherein belt 24 follows a zig-zag path before reaching rollers 32 and 30 and returning horizontally and tangentially along path 52 onto the spiraling path.

Figure 3:
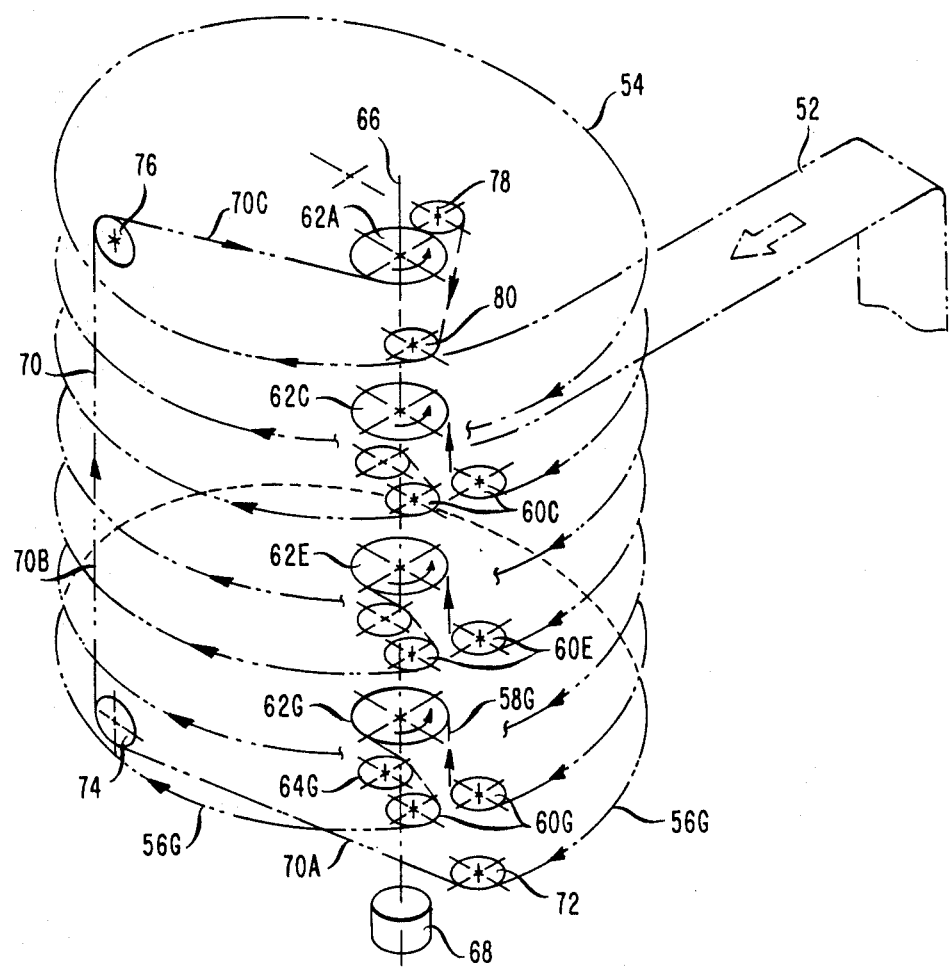
FIG. 3 is a diagram showing the routing of the chain of the system of FIG. 1.

Referring to FIG. 3, tangential conveyor path 52 is scehmatically shown leading to the chain system. Endless chain 54 is shown making seven turns in a descending spiral pattern. As shown herein every other turn is interrupted, although in some embodiments every turn can be interrupted. For example, the beginning of turn 56G is interrupted by being formed into a loop 58G. The interruption is caused by a pair of idler wheels 60G which route the loop 58G about drive sprocket 62G. Tension is maintained in the downstream half of loop 58G by a tension gear 64G, described hereinafter in greater detail. Drive sprocket 62G is mounted on a vertical shaft 66 together with three other equidistant drive sprockets 62A, 62C, 62E. Drive shaft 66 is driven by a drive means, in this embodiment, electrical motor assembly 68.

Chain 54 is returned from the end of last turn 56G to the start of first turn 56A by vertical looping 70. In the preferred embodiment chain 54 may be protected by a plastic tube during this looping. Looping 70 is composed of a lower horizontal leg 70A, a vertical leg 70B and an upper horizontal leg 70C. Leg 70A is marked by turning sprockets 72 and 74 whose axes are vertical and horizontal, respectively. Consequently, chain 54 must twist about its longitudinal axis 90° to accomodate the orthogonal axes of sprocket 72 and 74. Leg 70B is positioned within the confines defined by the spiraling of chain 54. The top horizontal leg 70C is marked by turning sprocket 76 and top drive sprocket 62A, having horizontal and vertical axes respectively. Consequently, chain 54 must twist 90° along its longitudinal axis between sprockets 76 and 62A. Chain 54 is played over drive sprocket 62A and around idler gear 78 may be spring biased to take up slack. From idler 78, chain 54 is routed around idler 80 to commence the beginning of the first turn 56A. It will be noted that each of the drive sprockets 62A-62G have idlers and tension gears similar to that associated with drive sprocket 62G.

Figure 4:
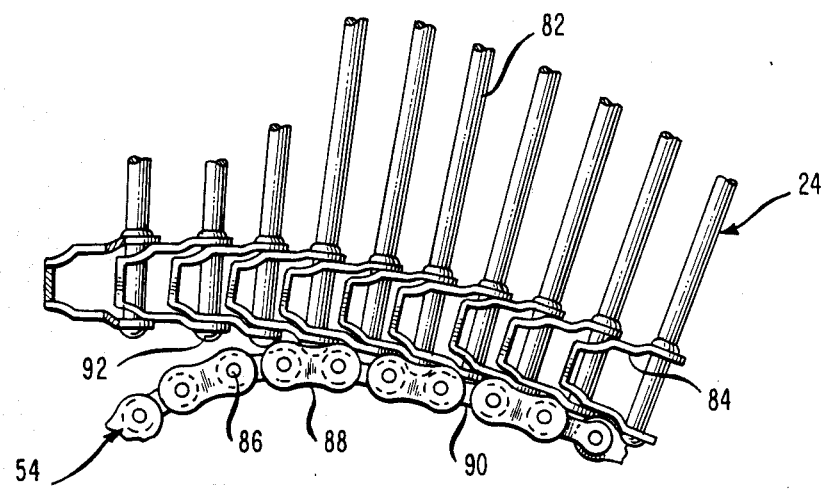
FIG. 4 is a plan view showing the connection between the belt and chain for the system of FIG. 1.
Figure 11:
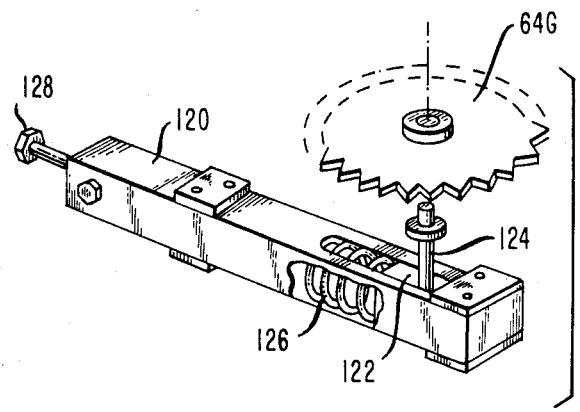
FIG. 11 is a perspective, partially exploded, view of a tension gear in the system of FIG. 1.

Referring to FIG. 4, conveyor belt 24 is shown composed of a plurality of spaced rods 82 loosely coupled at each end by links 84. The structure of conveyor belt 24 is conventional and may be an Omnigrid TM type of conveyor belt manufactured by Ashworth Brothers, Inc., Winchester, Virginia. Depending upon the size and production rate of the product carried by conveyor belt 24, the belt width may be 18, 24, 30, 36 or 42 inches wide.

Chain 54 is shown herein as a conventional roller chain having a plurality of pins 86 spanned by outside links 88 and inside links 90. Each of the rods 82 has a rounded head 92 which is shown nestled in the space between pins 86. Pins 86 are normally encased within annular roller sleeves 87. In this specification, when force is described as bearing on pin 86 this contemplates force being transferred through the outer roller sleeve 87 surrounding pin 86. The length of pin 86 is such that the rod heads 92 bear on the pins 86 via the roller sleeve 87 and need not bear on the links 88 and 90. In this specification, the edges of conveyor belt 24 are deemed to bear centrally on pins 86 since there is no intermediary between chain 54 and conveyor belt 24. For example, there are no cleats, flanges or brackets welded to links 88 and 90. For the interval illustrated herein, the rod to rod spacing seems to match the pin to pin spacing. This matching however, is not perfect and it can be expected that after a given number of rod spaces that a pin (or rod) will be skipped to account for a slight difference in pitch.

Figure 5:
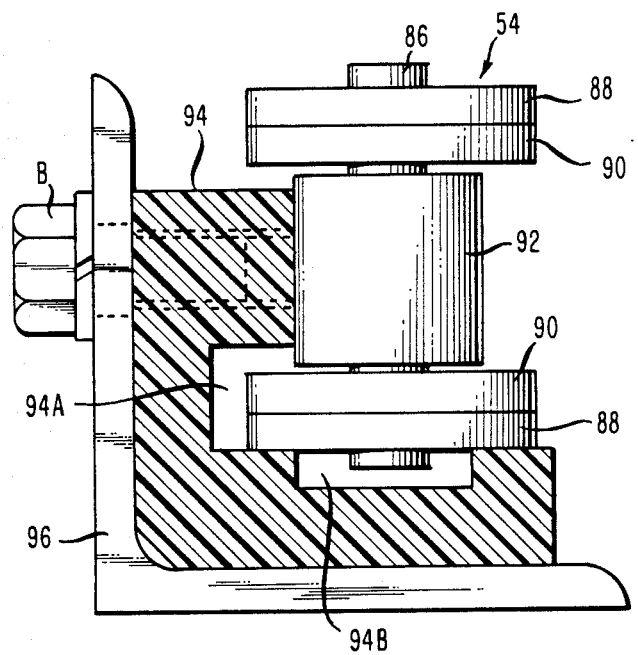
FIG. 5 is a sectional view of the chain and its guide assembly for the system of FIG. 1.

Referring to FIG. 5 the support mechanism for roller chain 54 is illustrated. This end view of chain 54 shows previously mentioned links 88 and 90 through which pin 86 is staked to support the central roller or sleeve 87.

A J-shaped guide 94 has a recess 94A to receive links 88 and 90. Also lower recess 94B allows clearance for pin 86. Guide 94 acts as a helical chain guide and is made of a lubricant-impregnated plastic that may be purchased from Nolu, Inc. of Asten, Pa.; their product type Nolu-S. Guide 94 is extruded to curve so that chain 54 may be coursed on the outside of the curve. Similarly, supporting angle iron 96 curves in the same direction as guide 94. While guide 94 is shown bolted by bolt B it may in other embodiments be riveted instead.

Figure 6:
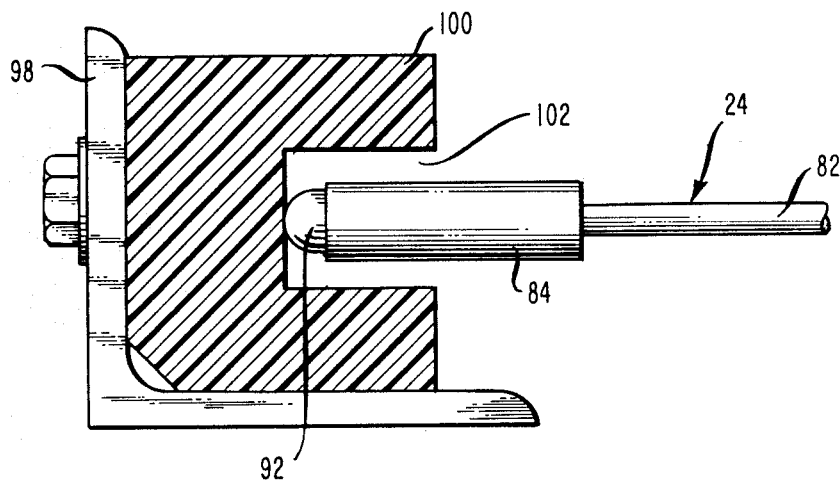
FIG. 6 is a sectional view of the guide for the lower turn of the belt for the system of FIG. 1.

Referring to FIG. 6, a similar angle iron 98 is shown supporting a C-shaped, plastic channel 100 made of the same material as guide 94 (FIG. 5) and extruded into a curved guide. The recess 102 is shown receiving the head 92 of rod 82, part of conveyor belt 24. Angle iron 98 is shaped as a curved holder as illustrated in FIG. 8.

Referring to FIG. 7 a partial elevational view is given of the uprights 10 and spokes 42 together with their associated structure. Spokes 42 extend radially from upright 10 and have mounted on it previously illustrated angle irons 96 holding chain guides 94. Claim 54 are shown herein sliding in guides 94 and it will be understood that chain 54 follows a spiral or helical path in this vicinity. The spokes 42 support straight struts 44 which are capped by a lubricant impregnated plastic caps 104. Caps 104 may be made of material similar to that of chain guide 94. Accordingly, belt 24 rests atop caps 104 with its inside edge bearing against the roller sleeves 87.

Figure 9:
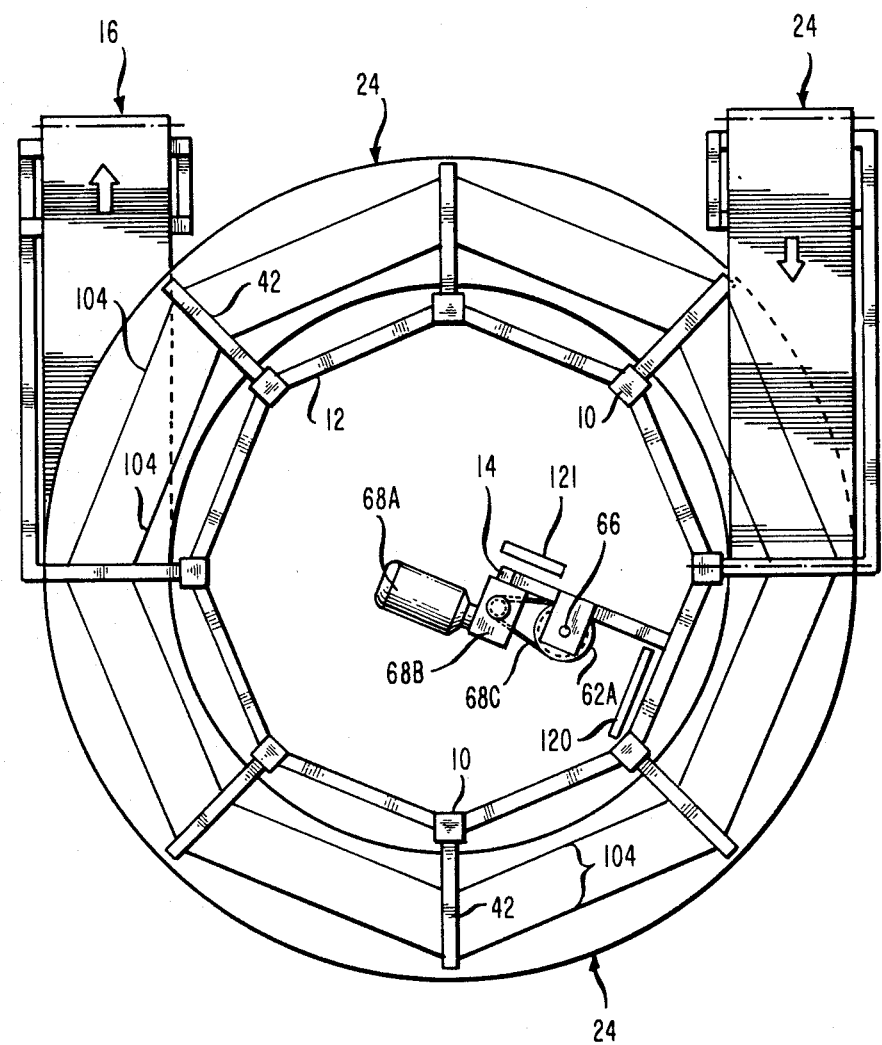
FIG. 9 is a plan view of the system of FIG. 1.
Figure 10:
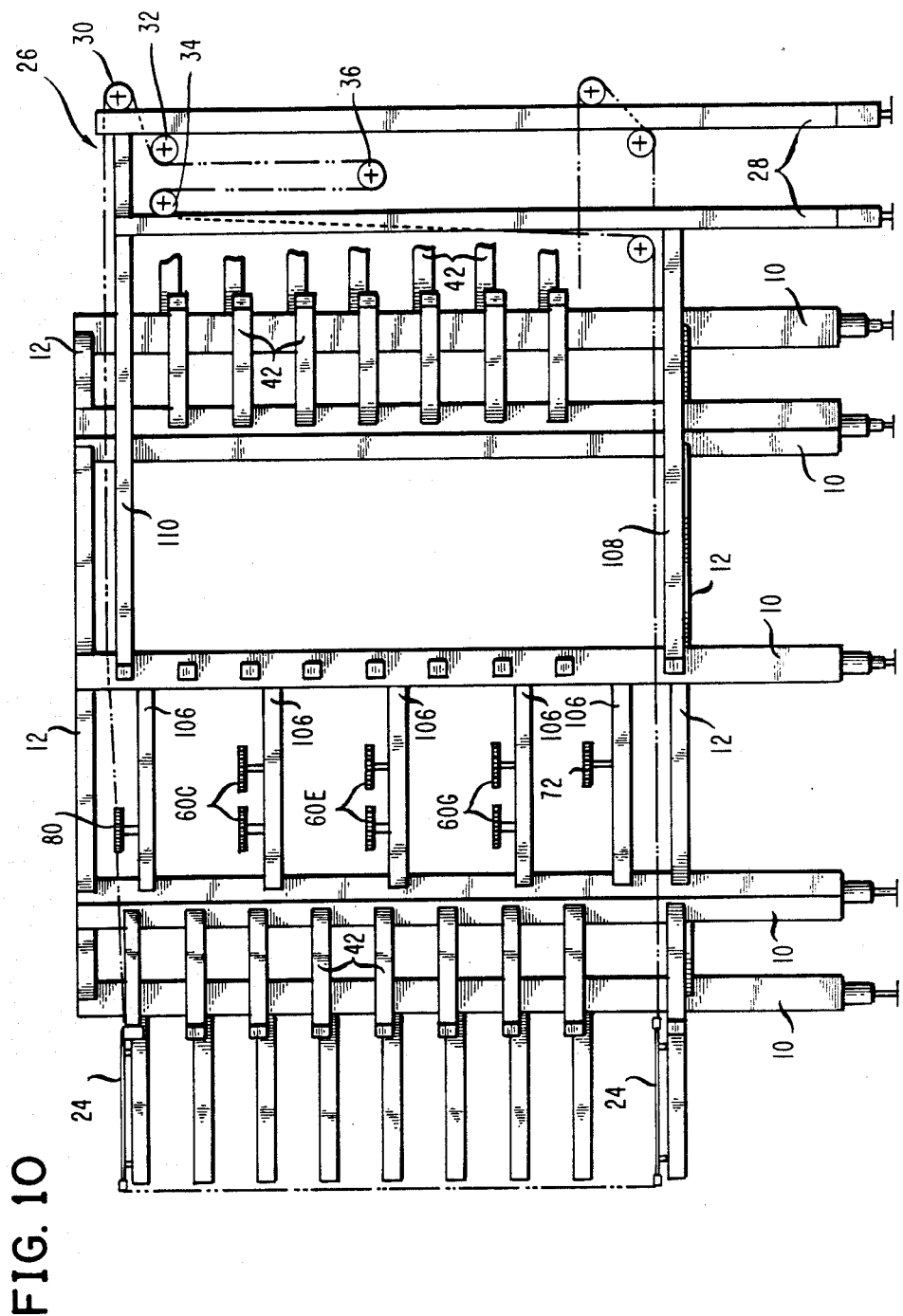
FIG. 10 is an elevational view of the frame of the system of FIG. 1.

Referring to FIGS. 9 and 10, a plan and elevational view, respectively, is given of the frame and its associated structure. Uprights 10 are shown distributed at 45° spacings in a circular plan. Each of the uprights 10 is shown having in the order of eight spokes 42 projecting radially outward therefrom. Near the top and bottom of uprights 10 are reinforcing struts 12 girdling the uprights. Also, five additional support beams 106 are shown spanning between two adjacent uprights 10 in the area where previously mentioned idler wheels 60G are located. Two other previously illustrated pairs of idler gears 60C and 60E are shown journalled on beams 106. Furthermore, previously illustrated idlers 80 and 72 are shown mounted on the top and bottom ones of beams 106.

Also, legs 28 of input section 26 employ supporting beams 108 and 110. Beams 108 and 110 together with legs 28 support previously mentioned rollers 30-34.

Previously mentioned motor assembly 68 is shown composed of electric motor 68A driving a gear reducer 68B that converts a horizontal shaft rotation into a vertical one. The output of gear box 68B drives chain 68C which drives the previously mentioned drive shaft 66. As explained earlier, drive shaft 66 has a plurality of drive sprockets on it, sprocket 62A being visible in FIG. 9. Also, the previously illustrated tension gears (e.g. gear 64G of FIG. 3) are journalled on a spring-biased carrier 120 attached to beams 106. Identical carrier 121 is attached to upright 14 to support previously mentioned tension gear 78 (FIG. 3).

Conveyor belt 24 (shown in phantom only in FIG. 9) is shown supported by straight struts 104. Since struts 104 are straight, the wear on the underside of conveyor 24 is distributed over a wide section of the belt.

To facilitate an understanding of the principles associated with the foregoing apparatus, its overall operation will now be briefly described. Initially the equipment may be installed at a side by welding and bolting the various frame members together. It will be noted that there is space within the perimeter of uprights 10 (FIG. 9) so that the apparatus may be installed around a column or other structural member of the buiding. Also, the apparatus can be assembled so that the input and output sections 26 and 16 can be set at 180° as shown or at any other angular position from 0° to 315°, in 45° increments. Also, for embodiments where more than eight uprights are used, the angular incrementation may be finer. The main drive motor 68A may be started by depressing start switch S2 (FIG. 12) to accelerate chain 54 gradually and cause it to circulate. Referring to FIG. 3, main drive motor 68 rotates sprockets 62A-62G. Consequently, chain 54 spirals (with interruptions) as illustrated. Upon completing the last (bottom) turn, chain 54 loops vertically along legs 70A, 70B and 70C to restart the spiraling cycle.

At the same time drive motor 68A accelerates, torque motor 46 does as well but more slowly. Until torque motor 46 increases its torque sufficiently, chain 54 will circulate without moving belt 24. The circulating chain 54 may be considered similar to a capstan on which a slack rope is wound. By pulling on such a rope, a small amount of tension can cause a relatively high output tension on the rope. Torque motor 46 (FIG. 2) can provide such starting tension. AS the torque from torque motor 46 (FIG. 2) increases, it pulls on belt 24 along its return path 50 (FIG. 2). Tension transmitted along return path 50 is also transmitted around rollers 20 and 22 on the output section 16. Consequently, tension is applied to the bottom turn of downwardly spiraling belt 24. Eventually, this tension is sufficient to bring the inside edge of belt 24 into intimate contact with chain 54 as illustrated in FIG. 4. It is preferable for the torque controller 118 (FIG. 12) to apply torque gradually. Consequently, the motion produced by motors 46 and 68A causes belt 24 to accelerate gradually. This avoids dislodging or disorienting the product that may be carried on belt 24. It is important to note that the main driving power is applied through sprockets 62A–62G at locations inwardly displaced from the conveyor belt. This means that the teeth of the sprockets 62A–62G do not directly react with the conveyor belt. This is an important feature that prevents displacement, chattering and disturbance to the conveyor belt. Instead of direct drive at the belt relatively simple idler gears or wheels with small or no projections may be used near the chain/belt interface.

The belt tension existing at tangential path 52 (FIG. 3) is of a magnitude determined by the friction along the spiral path as well as the loading caused by the product. During normal operation this tension stays within tolerable limits so that dancer roller 36 rises and falls but within limits. As previously mentioned, excessive vertical movement of roller 36 will cause interruption of the main drive power and stop the circulation of belt 24.

It is important to note that the torque produced by motor 46 may be adjusted to prevent slippage between belt 24 and chain 54. This is important since this feature reduces the wear that will occur on the edge of the belt. Consequently, both the belt 24 and chain 54 will spiral downwardly; thereafter recycling from bottom to top as indicated. This circulation continues until power is removed from the drive motors as previously described.

It will be appreciated that various modifications may be made with respect to the above described preferred embodiments. For example, the size, dimensions and number of various structural components can be changed depending upon the desired strength, weight and structural rigidity required for the conveyor system. While downward spiraling is shown, in some embodiments the direction may be reversed (although this may require a reordering of the components at the dancer station). Also, while spaced rods are preferred for the conveyor belt, other types of flexible belts may be used provided they have sufficient strength to support the product being conveyed. While various gears are shown for turning the belt and the chain, in some embodiments pulleys or other wheels may be used for the same purpose. Alternatively, a cylindrical roller may be employed in some embodiments where it is not desired to use gears.

Obviously, many modifications and variations of the present invention are possible in light of the above teachings. It is, therefore, to be understood that within the scope of the appended claims, the invention may be practiced otherwise than as specifically described.

What is claimed is:
1. A conveyor assembly comprising:
a frame member;
an endless chain slidingly mounted on and spirally coursed in a given peripheral direction about a plurality of turns about an internal cylinder defined by said frame member, said chain being formed of a plurality of spaced pins;
drive means for said endless chain for circulating said endless chain around said frame member, said drive means including a vertical drive shaft member driven by a motor, and provided with a plurality of spaced apart chain drive sprockets, a plurality of paired idler sprockets and a plurality of tensioning chain sprockets, each of said chain drive sprockets being mounted on said vertical drive shaft member at a height corresponding to a turn of said endless chain about said frame member, each of said paired idler sprockets cooperating with a respective chain drive sprocket, each of said tensioning chain sprockets cooperating with a respective one of said chain drive sprockets and cooperating paired idler sprockets whereby said endless chain is coursed at each of said respective turns from said frame member to a respective spaced apart chain drive sprocket and back to said frame member by cooperating paired idler sprockets and tensioning chain sprocket thereby to drive said endless chain at each of said respective turns about said internal cylinder;
an endless belt spirally coiled around said frame member for bearing edgewise in driving contact substantially about said internal cylinder of said endless chain between pins thereof whereby driving contact of said endless chains with said endless belt is effected substantially about each of said turns to cause circulation of said endless belt about said frame member; and
drive means for said endless belt for tensioning said endless belt to cause said endless belt to come into driving contact with said endless chain substantially about said internal cylinder thereby to circulate said endless belt about said frame member, said drive means including torque means coupled thereto for changing torque of said drive means for said endless belt.

2. The conveyor assembly according to claim 1 wherein said endless belt is routed to tangentially leave said frame member in one peripheral direction, move vertically and tangetially return to said frame member in another direction.

3. The conveyor assembly according to claim 1 wherein each of said drive sprockets further and further including a plurality of carrier members mounted on said frame member and wherein a respective tension sprocket is slidably and rotatably mounted in a carrier member, said tensioning sprocket being biased in said carrier member to bear against said endless chain downstream of each of said respective chain drive sprockets.

* * * * *